United States Patent
Shahriari et al.

(10) Patent No.: US 12,466,479 B1
(45) Date of Patent: Nov. 11, 2025

(54) MODEL-REFERENCE ADAPTIVE STEERING FEEDBACK CONTROL TO REDUCE UNFORESEEN OSCILLATIONS IN AUTOMATED DRIVING

(71) Applicant: GM Global Technology Operations LLC, Detroit, MI (US)

(72) Inventors: Mohammadali Shahriari, Markham (CA); Mehdi Abroshan, Waterloo (CA); Mohammed Raju Hossain, Markham (CA); Zhi Li, Unionville (CA); Ashraf Abualfellat, Grand Blanc, MI (US); Brian Porto, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 18/785,096

(22) Filed: Jul. 26, 2024

(51) Int. Cl.
*B62D 6/00* (2006.01)

(52) U.S. Cl.
CPC .................. *B62D 6/008* (2013.01)

(58) Field of Classification Search
CPC ........................................ B62D 6/008
See application file for complete search history.

(56) References Cited

U.S. PATENT DOCUMENTS

| | | | |
|---|---|---|---|
| 2009/0069979 A1* | 3/2009 | Yamashita | B62D 5/0463 701/42 |
| 2010/0152952 A1* | 6/2010 | Lee | B62D 15/025 701/41 |
| 2015/0158528 A1* | 6/2015 | Moshchuk | B62D 15/0265 701/41 |
| 2019/0389448 A1* | 12/2019 | Jung | B62D 6/008 |
| 2021/0053616 A1* | 2/2021 | Funke | G05D 1/0088 |

FOREIGN PATENT DOCUMENTS

| | | |
|---|---|---|
| DE | 102024204701 A1 | 12/2024 |
| GB | 2602476 A | 7/2022 |
| GB | 2630959 A | 12/2024 |

\* cited by examiner

*Primary Examiner* — Sizo B Vilakazi
(74) *Attorney, Agent, or Firm* — Vivacqua Crane, PLLC

(57) ABSTRACT

An adaptive method for controlling the steering of an autonomous vehicle includes receiving a steering input. The steering input is indicative of a desired road wheel angle. The method also includes determining a commanded torque to achieve the desired road wheel angle. The method also includes measuring the road wheel angle of the vehicle (i.e., the measured road wheel angle). The method also includes executing a feedback control to determine a torque overlay. The feedback control includes determining, in real time, a current steering error vector of the vehicle. The feedback control includes determining the difference between the current steering error vector and a predetermined-steering error dynamics vector. The feedback control also includes determining a feedback gain correction vector. The feedback gain correction vector is a function of the difference between the current steering error vector and the predetermined-steering error dynamics vector.

20 Claims, 2 Drawing Sheets

MODEL-REFERENCE ADAPTIVE STEERING FEEDBACK CONTROL TO REDUCE UNFORESEEN OSCILLATIONS IN AUTOMATED DRIVING

INTRODUCTION

The present disclosure generally relates to methods and systems for adaptive feedback control in autonomous vehicles.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Autonomous vehicles include steering control systems to manage steering. These steering control systems are used for lateral control of the autonomous vehicles and may include a feedback control and an adaptive model-based feedforward control. The feedback control may employ a gain scheduled control strategy that is calibrated over different operation ranges. However, this type of feedback control lacks an adaptation mechanism that takes into consideration different unknowns such as actuator and environmental uncertainties, causing noticeably high amplitude oscillations on the steering wheel. It is therefore desirable to develop a model-reference steering control strategy that includes an adaptive feedback methodology that adjusts the nonlinearity of the steering feedback automatically and provides a robust control technique.

SUMMARY

The present disclosure describes a method for controlling the steering of an autonomous vehicle. The method includes receiving a steering input. The steering input is indicative of a desired road wheel angle. The method also includes determining a commanded torque to achieve that desired road wheel angle. The method also includes measuring the road wheel angle of the vehicle (i.e., the measured road wheel angle). The method also includes executing a feedback control to determine a torque overlay. The feedback control includes determining, in real time, a current steering error vector of the vehicle. The feedback control includes determining the difference between the current steering error vector and a predetermined-steering error dynamics vector. The feedback control also includes determining a feedback gain correction vector. The feedback gain correction vector is a function of the difference between the current steering error vector and the predetermined-steering error dynamics vector. The feedback control also includes determining a torque overlay using the feedback gain correction vector. The method also includes applying the torque overlay to a steering wheel of the vehicle. To do so, a controller may command the electronic power steering system of the autonomous vehicle to apply the torque overlay to the steering wheel of the vehicle. The method described in this paragraph improves vehicle technology by enhancing the steering controls performance and also reduces the calibration effort by eliminating the need of gain scheduling over different scenarios and minimizes the steering feedback proliferation.

In an aspect of the present disclosure, the feedforward control may be a proportional-integral-derivative (PID) control. The feedback gain correction vector may be determined using the following equation:

$$\hat{W}_{t+1} = \hat{W}_t + \Gamma E(E-E_m)^T P B_2$$

where:
t is time;
$\hat{W}_{t+1}$ is the feedback gain correction vector at time k+1;
$\hat{W}_t$ is the feedback gain correction vector at time k;
$\Gamma$ is a predetermined, learning rate;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

The feedback gain correction vector includes a magnitude of a feedback gain correction and a first derivative of the magnitude of the feedback gain correction with respect to time.

The torque overlay may be determined using the following equation:

$$\tau = -(K+\hat{W}^T)E+\tau_r$$

$\tau_r$ is the commanded torque before correction;
T is a symbol representing a transpose of a matrix;
$\hat{W}$ is the feedback gain correction vector;
E is the current steering error vector;
K is a predetermined, design factor; and
$\tau$ is the torque overlay.

The feedback gain correction vector may be determined using the following equation:

$$\hat{W}_{t+1} = \hat{W}_t + \Gamma\beta(X)(E-E_m)^T P B_2$$

t is time;
$\hat{W}_{t+1}$ is the feedback gain correction vector at time k+1;
$\hat{W}_t$ is the feedback gain correction vector at time k;
$\Gamma$ is a predetermined, learning rate;
$\beta(X)$ is a basis function;
X is the state vector of the steering model;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution The torque overlay may be determined using a following equation:

$$\tau = -KE+\tau_r+\hat{W}^T\beta(X)$$

$\tau_r$ is the commanded torque;
T is a symbol representing a transpose of a matrix;
$\hat{W}$ is the feed gain correction vector;
$\beta(X)$ is a basis function;
X is the state vector of the steering model;
E is the current steering error vector;
K is a predetermined, design factor; and
$\tau$ is the torque overlay.

The feedback gain correction vector may be determined using a following equation:

$$\hat{W}_{t+1} = \hat{W}_t + \Gamma F(X)(E-E_m)^T P B_2$$

t is time;
$\hat{W}_{t+1}$ is the feedback gain correction vector at time k+1;
$\hat{W}_t$ is the feedback gain correction vector at time k;
$\Gamma$ is a predetermined, learning rate;
F(X) is a basis function;
X is the state vector of the steering model;
E is the current steering error vector;
T is a symbol representing a transpose of a matrix;
$E_m$ is the predetermined-steering error dynamics vector;

$B_2$ is an input matrix, wherein the input matrix is a predetermined vehicle parameter; and P is a Lyapunov equation unique solution.

The torque overlay may be determined using the following equation:

$$\tau = -KE + \tau_r + \hat{W}^T F(X)$$

$\tau_r$ is the commanded torque;

T is a symbol representing a transpose of a matrix;

$\hat{W}$ is the feed gain correction vector;

F(X) is a vector of radial basis functions;

X is the state vector of the steering model;

E is the current steering error vector;

K is a predetermined, design factor; and

τ is the torque overlay.

The present disclosure also describes a system for controlling the steering of a vehicle. The system includes a plurality of sensors and a controller. The controller is in communication with the sensors and is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
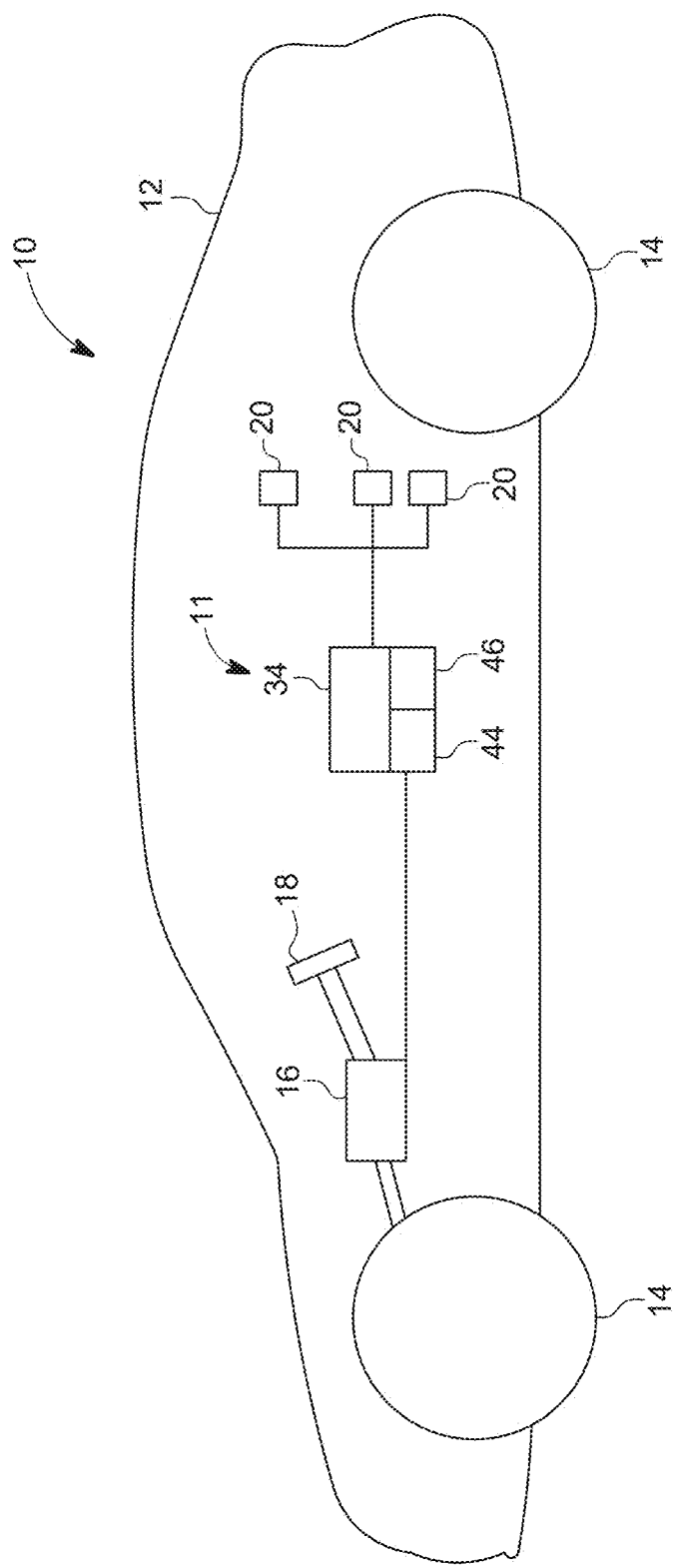
FIG. 1 is a schematic diagram of a vehicle including a system for controlling steering.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a vehicle body 12 and a plurality of wheels 14 coupled to the vehicle body 12. The vehicle 10 may be an autonomous vehicle. The vehicle 10 may be a sedan, a truck, a coupe, a sport utility vehicle (SUV), a recreational vehicles (RV). The vehicle 10 further includes a system 11 for steering. The system 11 may be part of an electronic power steering (EPS) system 16. The vehicle 10 includes a steering wheel 18 (i.e., a hand wheel) coupled to the EPS system 16. The EPS system 16 is connected to the steering wheel 18 and one or more wheels 14.

Further, the system 11 includes a controller 34 and one or more sensors 20 in communication with the controller 34. The sensors 20 collect information and generate sensor data indicative of the collected information. As non-limiting examples, the sensors 20 may include one or more steering angle sensors (SASs) configured to measure the steering angle of the steering wheel 18. The steering angle of the steering wheel is part of the steering input. The sensors 20 may also include a road wheel angle sensor configured to measure the road wheel angle of one or more wheels 14 of the vehicle 10.

The controller 34 is programmed to receive sensor data from the sensors 20 and includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensors 20, perform logic, calculations, methods and/or algorithms for automatically controlling the components of the vehicle 10, and generate control signals to the EPS system 16 to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

Steering oscillations around zero error may be caused by many factors, including EPS response due to wear and other reasons like calibrations. The system 11 employs a model-reference adaptive control strategy that creates a new adaptive feedback strategy. This new adaptive feedback strategy adjusts the nonlinearity of the steering feedback automatically and provides a robust control technique to eliminate undesired oscillations due to factors like hand wheel friction age over time. The system 11 enhances the controls performance an also reduces the calibration effort by eliminating the need of gain scheduling. Further, the feedback calibration strategy adjusts the gains automatically with generic initial values that enables seamless proliferation of feedback related calibration. The strategy explicitly and mathematically quantifies the performance of feedback control and transforms it into the executable automated gain scheduling adjustment.

Figure 2:
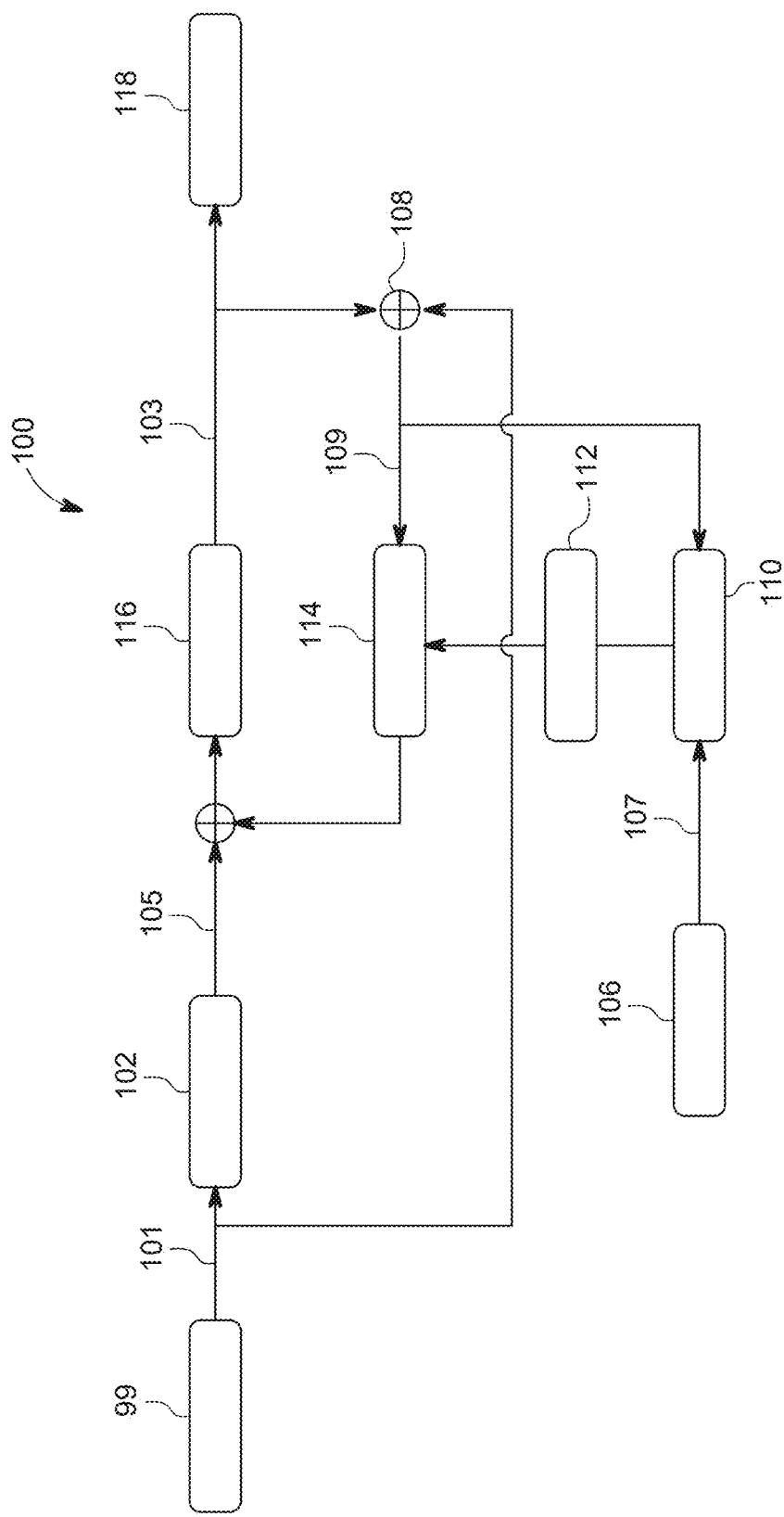
FIG. 2 is a block diagram of a method for controlling steering.

FIG. 2 is a block diagram of a method 100 for steering the vehicle 10. The method 100 begins at block 99 and then continues to block 102, which entails receiving a steering input 101 and executing a feedforward control using the desired steering input 101. The feedforward control receives one or more inputs, such as the steering input 101 and a road wheel angle 103 measured from the vehicle 10 by one or more sensors 20. The steering input 101 is indicative of a desired road wheel angle. The feedforward control outputs a commanded torque 105 to be applied to the steering wheel 18 (e.g., hand wheel) to achieve the desired road wheel angle. The EPS system 16 may apply the torque overlay to the steering wheel 18.

At block 106, the method 100 includes receiving the desired damping. The desired damping may be expressed as a predetermined-steering error dynamics vector 107. The predetermined-steering error dynamics vector 107 describes how fast and how dynamically we want the error to converge to zero and therefore includes two values. The first value of the predetermined-steering error dynamics vector 107 describes how fast we want the error to converge to zero and the second value of the predetermined-steering error dynamics vector 107 describes how dynamically we want the error to converge to zero.

The method 100 also includes block 108, which may be considered part of a feedback control. Block 108 includes determining, in real time, a current steering error vector 109 of the vehicle 10. The current steering error vector include a magnitude of a current steering error and a first derivative of the magnitude of the current steering error with respect to time. The magnitude of the current steering error is the difference between the desired road wheel angle and the road wheel angle measured from the vehicle 10 by one or more sensors 20 at the current time.

The method 100 includes block 110, which entails determining a difference between the current steering error vector and the predetermined-steering error dynamics vector. Block 110 receives the conditions to reset and certain design and vehicle parameters. With those parameters, at block 110, the feedback gain correction vector is determined. The feedback gain correction vector is a function of the difference between the current steering error vector and the predetermined-steering error dynamics vector. The feedback gain correction vector includes a magnitude of a feedback gain correction and a first derivative of the magnitude of the feedback gain correction with respect to time. The feedback gain correction vector is determined using a following equation:

$$\hat{W}_{t+1} = \hat{W}_t + \Gamma E(E-E_m)^T P B_2$$

where:
t is time;
$\hat{W}_{t+1}$ is the feedback gain correction vector at time k+1;
$\hat{W}_t$ is the feedback gain correction vector at time k;
F is a predetermined, learning rate;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

The method 100 also includes block 110, in which a domain-based switch is employed. Then, the method 100 continues to block 114. At block 114, the controller 34 executes a feedback control strategy, such as a Proportional-integral-derivative (PID) control, to determine the torque overlay to be applied to the steering wheel 18 to achieve the desired road wheel angle. The inputs of the feedback control strategy may include the feedback gain correction vector and the current steering error vector 109. The feedback control strategy outputs the torque overlay to be applied to the steering wheel 18 to achieve the desired road wheel angle. The torque overlay may be determined using a following equation:

$$\tau = -(K+\hat{W}^T)E+\tau_r$$

$\tau_r$ is the commanded torque;
T is a symbol representing a transpose of a matrix;
$\hat{W}$ is the feed gain correction vector;
E is the current steering error vector;
K is a predetermined feedback gain, design factor; and
$\tau$ is the torque overlay.

The method also includes block 116. Block 116 entails applying the torque overlay to the steering wheel 18 of the vehicle 10. To do so, the controller 34 commands the EPS system 16 to apply the torque overlay to the steering wheel 18 of the vehicle 10.

In another embodiment, the feedback gain correction vector may be determined using a following equation:

$$\hat{W}_{t+1} = \hat{W}_t + \Gamma \beta(X)(E-E_m)^T P B_2$$

t is time;
$\hat{W}_{t+1}$ is the feedback gain correction vector at time k+1;
$\hat{W}_t$ is the feedback gain correction vector at time k;
$\Gamma$ is a predetermined, learning rate;
$\beta(X)$ is a basis function;
X is the state vector of the steering model;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

In this embodiment, the torque overlay may be determined using a following equation:

$$\tau = -KE+\tau_r+\hat{W}^T\beta(X)$$

$\tau_r$ is the commanded torque;
T is a symbol representing a transpose of a matrix;
$\hat{W}$ is the feed gain correction vector;
$\beta(X)$ is a basis function;
X is the state vector of the steering model;
E is the current steering error vector;
K is a predetermined, design factor; and
$\tau$ is the torque overlay.

In yet another embodiment, a neuro-fuzzy mechanism is used to determine the feedback gain correction vector. The neuro-fuzzy mechanism characterizes and learns the gain in over piecewise linear regions. In this embodiment, the feedback gain correction vector is determined using a following equation:

$$\hat{W}_{t+1} = \hat{W}_t + \Gamma F(X)(E-E_m)^T P B_2$$

t is time;
$\hat{W}_{t+1}$ is the feedback gain correction vector at time k+1;
$\hat{W}_t$ is the feedback gain correction vector at time k;
$\Gamma$ is a predetermined, learning rate;
F(X) is a basis function;
X is the state vector of the steering model;
E is the current steering error vector;
T is a symbol representing a transpose of a matrix;
$E_m$ is the predetermined-steering error dynamics vector;

$B_2$ is an input matrix, wherein the input matrix is a predetermined vehicle parameter; and P is a Lyapunov equation unique solution.

In this embodiment, the torque overly may be determined using the following equation:

$$\tau = -KE + \tau_r + \hat{W}^T F(X)$$

$\tau_r$ is the commanded torque;

T is a symbol representing a transpose of a matrix;

$\hat{W}$ is the feed gain correction vector;

F(X) is a radial basis function;

X is the state vector of the steering model;

E is the current steering error vector;

K is a predetermined, design factor; and

τ is the torque overlay.

The method 100 ends at block 118. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling a steering of a vehicle, comprising:

receiving a steering input, wherein the steering input is indicative of a desired road wheel angle;

determining a commanded torque to achieve the desired road wheel angle;

measuring a measured road wheel angle of the vehicle;

executing a feedback control to determine a torque overlay, wherein the feedback control includes:

determining, in real time, a current steering error vector of the vehicle;

determining a difference between the current steering error vector and a predetermined-steering error dynamics vector;

determining a feedback gain correction vector, wherein the feedback gain correction vector is a function of the difference between the current steering error vector and the predetermined-steering error dynamics vector;

determining a torque overlay using the feedback gain correction vector; and applying the torque overlay to a steering wheel of the vehicle.

2. The method of claim 1, wherein a feedback control is a Proportional-integral-derivative (PID) control.

3. The method of claim 1, wherein the commanded torque is determined using a combination of feedforward and feedback control.

4. The method of claim 2, wherein the feedback gain correction vector is determined using a following equation:

$$\hat{W}_{t+1} = \hat{W}_t + \Gamma E (E - E_m)^T P B_2$$

where:

t is time;

$\hat{W}_{t+1}$ is the feedback gain correction vector at time k+1;

$\hat{W}_t$ is the feedback gain correction vector at time k;

Γ is a predetermined, learning rate;

E is the current steering error vector;

T is a symbol representing a transpose of a matrix;

$E_m$ is the predetermined-steering error dynamics vector;

$B_2$ is an input matrix, wherein the input matrix is a predetermined vehicle parameter; and P is a Lyapunov equation unique solution.

5. The method of claim 2, wherein the torque overlay is determined using a following equation:

$$\tau = -(K + \hat{W}^T) E + \tau_r$$

$\tau_r$ is the commanded torque;

T is a symbol representing a transpose of a matrix;

$\hat{W}$ is the feed gain correction vector;

E is the current steering error vector;

K is a predetermined, design factor; and

τ is the torque overlay.

6. The method of claim 4, wherein the feedback gain correction vector includes a magnitude of a proportional gain correction and a magnitude of the derivative gain correction with respect to time.

7. The method of claim 2, wherein the feedback gain correction vector is determined using a following equation:

$$\hat{W}_{t+1} = \hat{W}_t + \Gamma\beta(X)(E-E_m)^T PB_2$$

t is time;
$\hat{W}_{t+1}$ is the feedback gain correction vector at time k+1;
$\hat{W}_t$ is the feedback gain correction vector at time k;
F is a predetermined, learning rate;
$\beta(X)$ is a basis function;
X is the state vector of the steering model;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

8. The method of claim 2, wherein the torque overlay is determined using a following equation:

$$\tau = -KE + \tau_r + \hat{W}^T\beta(X)$$

$\tau_r$ is the commanded torque;
T is a symbol representing a transpose of a matrix;
$\hat{W}$ is the feed gain correction vector;
$\beta(X)$ is a basis function;
X is the state vector of the steering model;
E is the current steering error vector;
K is a predetermined, design factor; and
$\tau$ is the torque overlay.

9. The method of claim 2, wherein the feedback gain correction vector is determined using a following equation:

$$\hat{W}_{t+1} = \hat{W}_t + \Gamma F(X)(E-E_m)^T PB_2$$

k is time;
$\hat{W}_{t+1}$ is the feedback gain correction vector at time k+1;
$\hat{W}_t$ is the feedback gain correction vector at time k;
$\Gamma$ is a predetermined, learning rate;
F(X) is a basis function;
X is the state vector of the steering model;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

10. The method of claim 2, wherein the torque overlay is determined using a following equation:

$$\tau = -KE + \tau_r + \hat{W}^T F(X)$$

$\tau_r$ is the commanded torque;
T is a symbol representing a transpose of a matrix;
$\hat{W}$ is the feed gain correction vector;
F(X) is a radial basis function;
X is the state vector of the steering model;
E is the current steering error vector;
K is a predetermined, design factor; and
$\tau$ is the torque overlay.

11. A system for controlling a steering of a vehicle, comprising:
a plurality of sensors;
a controller in communication with the plurality of sensors, wherein the controller is programmed to:
receive a steering input, wherein the steering input is indicative of a desired road wheel angle;
determine a commanded torque to achieve the desired road wheel angle;
command at least one of the plurality of sensors to obtain a measured road wheel angle of the vehicle;
execute a feedback control to determine a torque overlay, wherein the feedback control includes:
determine, in real time, a current steering error vector of the vehicle;
determine a difference between the current steering error vector and a predetermined-steering error dynamics vector;
determine a feedback gain correction vector, wherein the feedback gain correction vector is a function of the difference between the current steering error vector and the predetermined-steering error dynamics vector;
determine a torque overlay using the feedback gain correction vector;
command an electronic power steering system to apply the torque overlay to a steering wheel of the vehicle.

12. The system of claim 11, wherein a feedback control is a Proportional-integral-derivative (PID) control.

13. The system of claim 11, wherein the commanded torque is determined using a combination of feedforward and feedback control.

14. The system of claim 12, wherein the feedback gain correction vector is determined using a following equation:

$$\hat{W}_{t+1} = \hat{W}_t + \Gamma E(E-E_m)^T PB_2$$

where:
t is time;
$\hat{W}_{t+1}$ is the feedback gain correction vector at time k+1;
$\hat{W}_t$ is the feedback gain correction vector at time k;
F is a predetermined, learning rate;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

15. The system of claim 12, wherein the torque overlay is determined using a following equation:

$$\tau = -(K+\hat{W}^T)E + \tau_r$$

$\tau_r$ is the commanded torque;
T is a symbol representing a transpose of a matrix;
$\hat{W}$ is the feed gain correction vector;
E is the current steering error vector;
K is a predetermined, design factor; and
$\tau$ is the torque overlay.

16. The system of claim 14, wherein the feedback gain correction vector includes a magnitude of a proportional gain correction and a magnitude of the derivative gain correction with respect to time.

17. The system of claim 12, wherein the feedback gain correction vector is determined using a following equation:

$$\hat{W}_{t+1} = \hat{W}_t + \Gamma\beta(X)(E-E_m)^T PB_2$$

t is time;
$\hat{W}_{t+1}$ is the feedback gain correction vector at time k+1;
$\hat{W}_t$ is the feedback gain correction vector at time k;
$\Gamma$ is a predetermined, learning rate;
$\beta(X)$ is a basis function;
X is the state vector of the steering model;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

18. The system of claim 12, wherein the torque overlay is determined using a following equation:

$$\tau = -KE + \tau_r + \hat{W}^T\beta(X)$$

$\tau_r$ is the commanded torque;
T is a symbol representing a transpose of a matrix;
$\hat{W}$ is the feed gain correction vector;
$\beta(X)$ is a basis function;
X is the state vector of the steering model;
E is the current steering error vector;
K is a predetermined, design factor; and
$\tau$ is the torque overlay.

19. The system of claim 12, wherein the feedback gain correction vector is determined using a following equation:

$$\hat{W}_{t+1} = \hat{W}_t + \Gamma F(X)(E-E_m)^T P B_2$$

t is time;
$\hat{W}_{t+1}$ is the feedback gain correction vector at time k+1;
$\hat{W}_t$ is the feedback gain correction vector at time k;
$\Gamma$ is a predetermined, learning rate;
F(X) is a basis function;
X is the state vector of the steering model;
E is the current steering error vector;
T is a symbol representing a transpose of a matrix;
$E_m$ is the predetermined-steering error dynamics vector;
$B_2$ is an input matrix, wherein the input matrix is a predetermined vehicle parameter; and
P is a Lyapunov equation unique solution.

20. A method for controlling a steering of a vehicle, comprising:
    receiving a steering input, wherein the steering input is indicative of a desired road wheel angle;
    determining a commanded torque to achieve the desired road wheel angle;
    measuring a measured road wheel angle of the vehicle;
    executing a feedback control to determine a torque overlay, wherein the feedback control includes:
        determining, in real time, a current steering error vector of the vehicle;
        determining a difference between the current steering error vector and a predetermined-steering error dynamics vector;
        determining a feedback gain correction vector, wherein the feedback gain correction vector is a function of the difference between the current steering error vector and the predetermined-steering error dynamics vector;
        determining a torque overlay using the feedback gain correction vector; and
    commanding an electronic power steering system to apply the torque overlay to a steering wheel of the vehicle.

\* \* \* \* \*